No. 608,892. Patented Aug. 9, 1898.
N. C. MURRAY.
END GATE LOCK.
(Application filed July 17, 1897.)
(No Model.)
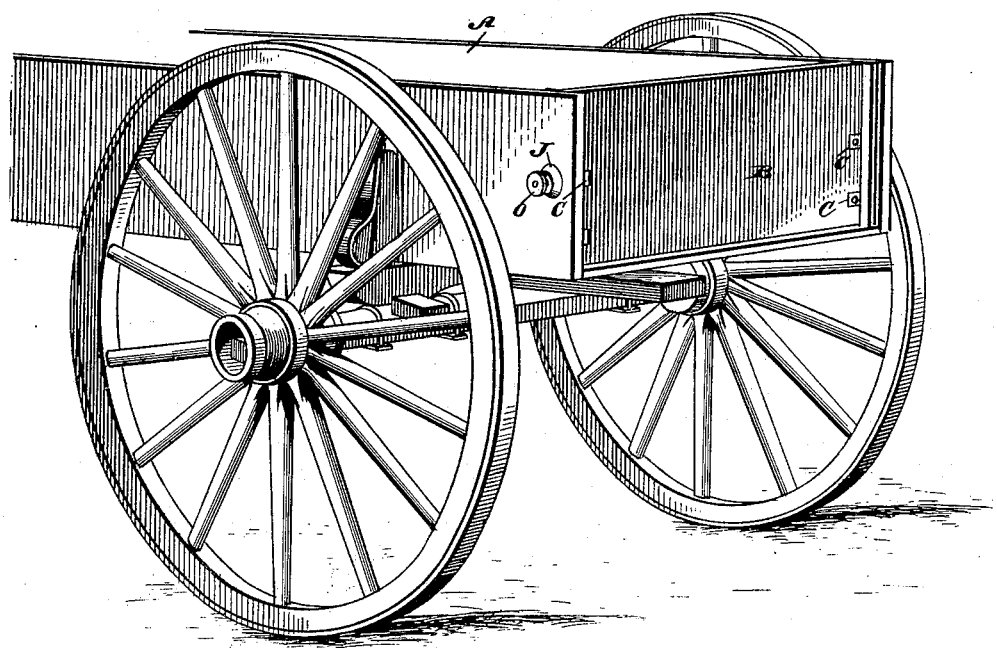
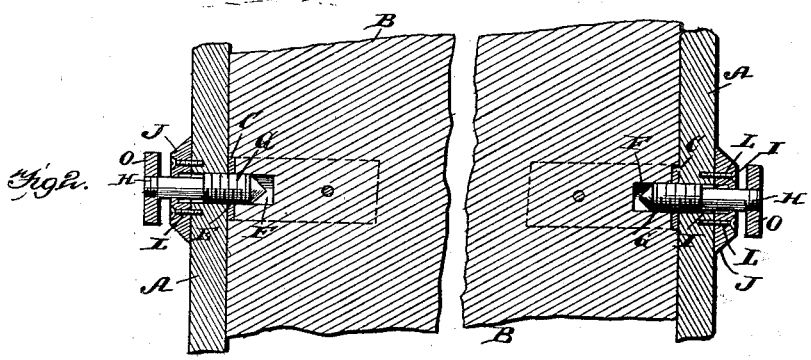
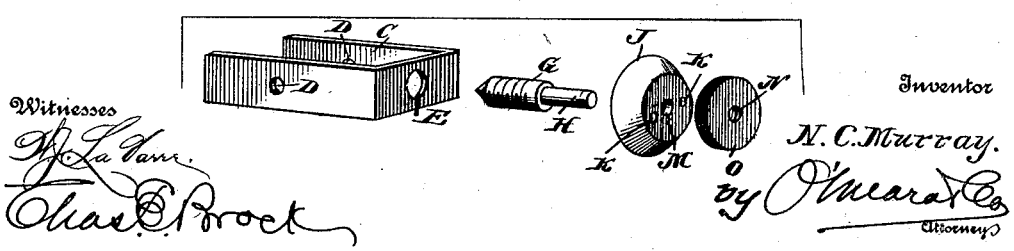
Witnesses
Inventor
N. C. Murray.

UNITED STATES PATENT OFFICE.

NICHOLAS CHARLES MURRAY, OF KINGSTON, TEXAS.

END-GATE LOCK.

SPECIFICATION forming part of Letters Patent No. 608,892, dated August 9, 1898.

Application filed July 17, 1897. Serial No. 644,958. (No model.)

*To all whom it may concern:*

Be it known that I, NICHOLAS CHARLES MURRAY, residing at Kingston, in the county of Hunt and State of Texas, have invented a new and useful End-Gate Lock, of which the following is a specification.

My invention has relation to certain improvements in end-gates, and more particularly to a fastening device therefor.

An object of the invention is to provide a fastening for end-gates of wagons and the like, the arrangement of parts being such as to permit the end-gate being always held in a locked position until it is desired to lower or raise the same.

A further object of the invention is to provide an end-gate fastening simple in construction and composed of but a minimum number of parts.

With these and other objects in view the invention consists in certain novel features of construction and in combinations and arrangements of parts, as will be more fully hereinafter described, and specifically pointed out in the claim.

Referring to the accompanying drawings, illustrating my invention, Figure 1 is a perspective view showing my device in operative position. Fig. 2 is a vertical sectional view, and Fig. 3 is a detail perspective view, of the parts disassembled.

Like letters of reference will designate similar parts wherever they occur throughout the several views.

In the practical embodiment of my invention I have shown a wagon A, the same being provided with an end-gate B.

C indicates an approximately U-shaped plate to embrace the side edges of the end-gate, the same being provided with openings D to receive fastening-bolts, which are passed therethrough when the plates are to be secured to the end-gate. This plate at its closed end is provided with a threaded opening E, the purpose of which will be shortly described.

F indicates openings formed in the side edges of the end-gate to receive the screw-threaded enlarged end of a bolt G, the upper portion or stem H of said bolt being reduced to extend through the openings I in the sides and near the end of the vehicle.

J represents a washer having openings K for the passage of screws L, so that said washer can be secured to the ends of the vehicle, this washer being also provided with a central opening M, through which the stem H of the bolt G is adapted to extend, the free end of the stem also passing through an opening N of a knob O and secured therein, so that the knob can be grasped and turned as the end-gate is to be locked or the same lowered.

It will be noticed the end of the threaded portion of the bolt G tapers to a point, as shown at P, so that said bolt can be easily screwed into and will easily fit within the openings F, formed in the side edges of the end-gate.

The operation of the device will be readily understood from the foregoing description and may be briefly stated as follows: Supposing the parts to be in position shown in Figs. 1 and 2, should it be desired to raise the end-gate the knobs O are turned to the left, thereby releasing the threaded ends of the bolts G from the openings E of the plates C and the openings F in the edges of the end-gate, thereby permitting said gate to be raised. When the gate is lowered and it is desired to lock the same to the sides of the vehicle, the knobs are turned in the opposite direction to that just described until the several parts have been securely fastened. In order that the gate may be secured in a partly-raised position, I provide upon the end edges, adjacent to the lower edge of the gate, the same mechanism in the gate portion as hereinafter described, consisting of duplicate parallel U-shaped portions C and recesses F, adapted to operate in connection with the bolts G when the latter register therewith.

It should be observed that by reason of the enlarged threaded end of the bolt and the reduced stem portion thereof it will be impossible to withdraw the knob entirely from the side of the vehicle, hence preventing the dropping out of the locking-bolt.

From the foregoing description it will be seen that I have produced an exceedingly cheap and simple construction of end-gate fastening and that by its use I am at all times enabled to secure the gate in the desired position without any possibility of the same flying open.

It is of course understood that I do not limit myself to the use of any particular kind of material in constructing my improved locking device, and it is also evident that various slight changes might be made in the forms, constructions, and arrangements of the parts described without departing from the spirit and scope of my invention. Hence I do not care to be confined to the exact construction herein set forth, but consider myself clearly entitled to all such slight changes or variations that may fall within the spirit and scope of my invention.

Having thus fully described my invention, what I claim as new, and desire to secure by Letters Patent of the United States, is—

The combination with the end-gate having a cavity formed in its end, a U-shaped plate having its legs adapted to extend on each side of the gate and provided with a screw-threaded opening in its end which is adapted to register with the cavity of the gate and also with a passage formed in the side of the wagon, a plate secured upon the outer side of the wagon and apertured in line with the passage formed in said wagon side, the aperture of said plate being enlarged on its inner side so as to be of the same size as said passage, a bolt having its inner end enlarged and screw-threaded, said enlarged end moving in the passage in the wagon side and in the enlarged aperture of the plate and adapted to engage the screw-threaded opening in the U-shaped plate, said bolt entering the cavity of the end-gate with the reduced portion thereof passing through the apertures of the plate and extending to the interior thereof, and an operating-knob upon the outer end of said bolt whereby it may be rotated, substantially as set forth.

NICHOLAS CHARLES MURRAY.

Witnesses:
 J. A. BARNHART,
 B. S. COLLEY.